United States Patent
Boyers et al.

(10) Patent No.: US 12,453,549 B2
(45) Date of Patent: Oct. 28, 2025

(54) DEVICE AND METHOD FOR UNLATCHING A SURGICAL CLIP

(71) Applicant: TELEFLEX MEDICAL INCORPORATED, Morrisville, NC (US)

(72) Inventors: Jessica Boyers, Morrisville, NC (US); Jessie Delgado, Durham, NC (US)

(73) Assignee: TELEFLEX MEDICAL INCORPORATED, Morrisville, NC (US)

( * ) Notice: Subject to any disclaimer, the term of this patent is extended or adjusted under 35 U.S.C. 154(b) by 425 days.

(21) Appl. No.: 17/738,580

(22) Filed: May 6, 2022

(65) Prior Publication Data

US 2022/0354484 A1 Nov. 10, 2022

Related U.S. Application Data

(60) Provisional application No. 63/185,920, filed on May 7, 2021.

(51) Int. Cl.
*A61B 17/04* (2006.01)
*A61B 17/28* (2006.01)

(52) U.S. Cl.
CPC ........ *A61B 17/0487* (2013.01); *A61B 17/282* (2013.01); *A61B 2017/049* (2013.01)

(58) Field of Classification Search
CPC ...................... A61B 17/0487; A61B 2017/049
See application file for complete search history.

(56) References Cited

U.S. PATENT DOCUMENTS

| | | | |
|---|---|---|---|
| 2,498,372 A | 2/1950 | Kortlucke, Jr. | |
| 2,635,238 A | 4/1953 | Mather | |
| 3,344,649 A | 10/1967 | Wood | |
| 3,805,792 A | 4/1974 | Cogley | |
| 3,825,012 A | 7/1974 | Nicoll | |
| 4,073,179 A | 2/1978 | Hickey | |
| 4,434,795 A | 3/1984 | Mericle | |
| 4,444,187 A | 4/1984 | Carney | |
| 4,450,840 A | 5/1984 | Mericle | |
| 4,487,204 A * | 12/1984 | Hrouda | A61B 17/122 606/142 |
| 4,527,562 A | 7/1985 | Mericle | |
| 4,570,633 A * | 2/1986 | Golden | A61B 17/128 227/19 |
| 4,589,631 A | 5/1986 | Markus | |

(Continued)

*Primary Examiner* — Alexander J Orkin
(74) *Attorney, Agent, or Firm* — BakerHostetler (57) ABSTRACT

The present disclosure is directed a method and device for unlatching a clip. The clip may have first and second leg members, the first leg member having a hook member and the second leg member having a tip member restrained by the hook member in the latched configuration. The method may include receiving the clip between first and second jaw members of a device and engaging the hook member of the first leg member with a wall of the second jaw member. The method may further include pressing on an outer surface of the first leg member with the first jaw member to open the hook member and release the clip from the latched configuration and receiving the tip member in a channel of the second jaw member after being unrestrained by the hook member where the tip member is spaced apart from the hook member.

21 Claims, 7 Drawing Sheets

(56) References Cited

U.S. PATENT DOCUMENTS

| | | | |
|---|---|---|---|
| 4,638,804 A * | 1/1987 | Jewusiak | A61L 31/06 606/158 |
| 4,834,096 A | 5/1989 | Oh et al. | |
| 5,046,611 A | 9/1991 | Oh | |
| 5,100,416 A | 3/1992 | Oh et al. | |
| 5,201,416 A | 4/1993 | Taylor | |
| 5,312,420 A | 5/1994 | Toso et al. | |
| 5,562,681 A | 10/1996 | Crainich | |
| 5,658,297 A | 8/1997 | Crainich | |
| 5,707,377 A | 1/1998 | Keller et al. | |
| D439,817 S | 4/2001 | Lehmann | |
| 6,210,419 B1 | 4/2001 | Mayenberger et al. | |
| 6,261,303 B1 | 7/2001 | Mayenberger et al. | |
| 6,293,956 B1 | 9/2001 | Crainich et al. | |
| 6,391,035 B1 | 5/2002 | Appleby et al. | |
| 6,481,691 B1 | 11/2002 | Irving | |
| 6,610,074 B2 | 8/2003 | Santilli | |
| 6,733,514 B2 | 5/2004 | Miser | |
| 6,824,547 B2 | 11/2004 | Wilson, Jr. et al. | |
| 7,131,977 B2 | 11/2006 | Fowler | |
| 7,211,091 B2 | 5/2007 | Fowler et al. | |
| 7,211,092 B2 | 5/2007 | Hughett | |
| 7,326,223 B2 | 2/2008 | Wilson, Jr. | |
| 7,582,086 B2 | 9/2009 | Privitera et al. | |
| 7,585,304 B2 | 9/2009 | Hughett | |
| 8,177,793 B2 | 5/2012 | Mijares et al. | |
| 8,241,303 B2 | 8/2012 | Sinnreich et al. | |
| 8,579,917 B1 | 11/2013 | Sinnreich et al. | |
| 8,591,524 B1 | 11/2013 | Sinnreich et al. | |
| 8,617,182 B1 | 12/2013 | Sinnreich et al. | |
| 8,690,896 B1 | 4/2014 | Sinnreich et al. | |
| 9,220,507 B1 * | 12/2015 | Patel | A61B 17/064 |
| 9,271,737 B2 | 3/2016 | Castro et al. | |
| 9,289,216 B2 | 3/2016 | Weisshaupt et al. | |
| 9,332,989 B2 | 5/2016 | Morales | |
| 9,445,820 B2 | 9/2016 | Whiting | |
| 9,456,824 B2 | 10/2016 | Willett et al. | |
| 9,572,579 B2 | 2/2017 | Weisshaupt | |
| 9,855,053 B2 | 1/2018 | Bagaoisan et al. | |
| 9,968,361 B2 * | 5/2018 | Aranyi | A61B 17/1285 |
| 10,130,373 B2 | 11/2018 | Castro et al. | |
| 10,307,166 B2 | 6/2019 | Willett et al. | |
| 10,335,157 B2 * | 7/2019 | Patel | A61B 17/1285 |
| 10,537,328 B2 | 1/2020 | Smith et al. | |
| 10,542,998 B2 | 1/2020 | Whiting | |
| 10,548,609 B2 | 2/2020 | Ramsey et al. | |
| 10,820,909 B2 | 11/2020 | Bagaoisan et al. | |
| 10,925,616 B2 | 2/2021 | Shellenberger et al. | |
| 10,945,740 B2 | 3/2021 | Foshee et al. | |
| 11,147,566 B2 | 10/2021 | Pilletere et al. | |
| 11,160,559 B2 | 11/2021 | Shellenberger | |
| 11,266,408 B2 | 3/2022 | Shellenberger | |
| 11,304,703 B2 | 4/2022 | Pilletere et al. | |
| 2004/0044352 A1 | 3/2004 | Fowler et al. | |
| 2004/0044363 A1 | 3/2004 | Fowler | |
| 2005/0165422 A1 | 7/2005 | Wilson | |
| 2005/0171560 A1 * | 8/2005 | Hughett | A61B 17/1285 606/142 |
| 2007/0021777 A1 | 1/2007 | Fowler | |
| 2009/0171380 A1 | 7/2009 | Whiting | |
| 2010/0114131 A1 | 5/2010 | Rotunda | |
| 2012/0083803 A1 | 4/2012 | Patel et al. | |
| 2012/0226291 A1 * | 9/2012 | Malizia | A61B 17/1227 606/151 |
| 2013/0245653 A1 * | 9/2013 | Litherland | A61B 17/128 606/158 |
| 2013/0253540 A1 | 9/2013 | Castro et al. | |
| 2013/0261642 A1 | 10/2013 | Willett et al. | |
| 2014/0243862 A1 * | 8/2014 | Bagaoisan | A61B 17/122 606/157 |
| 2016/0151073 A1 | 6/2016 | Castro et al. | |
| 2016/0354089 A1 | 12/2016 | Whiting | |
| 2017/0020530 A1 | 1/2017 | Willett et al. | |
| 2017/0027576 A1 * | 2/2017 | Castro | A61B 17/1285 |
| 2018/0036008 A1 | 2/2018 | Ramsey et al. | |
| 2018/0168659 A1 | 6/2018 | Bagaoisan et al. | |
| 2018/0271527 A1 | 9/2018 | Shellenberger | |
| 2018/0271532 A1 | 9/2018 | Shellenberger | |
| 2018/0271534 A1 | 9/2018 | Shellenberger | |
| 2018/0271535 A1 | 9/2018 | Shellenberger et al. | |
| 2018/0271536 A1 | 9/2018 | Shellenberger et al. | |
| 2018/0368852 A1 | 12/2018 | Foshee et al. | |
| 2019/0046200 A1 | 2/2019 | Stokes | |
| 2019/0357913 A1 | 11/2019 | Pilletere et al. | |
| 2020/0046359 A1 | 2/2020 | Thomas et al. | |
| 2020/0060684 A1 | 2/2020 | Thomas et al. | |
| 2020/0360021 A1 | 11/2020 | Foshee | |
| 2021/0007751 A1 | 1/2021 | Shellenberger et al. | |
| 2021/0128159 A1 | 5/2021 | Taylor et al. | |
| 2021/0186511 A1 | 6/2021 | Shellenberger et al. | |
| 2021/0267603 A1 | 9/2021 | Foshee et al. | |
| 2022/0047269 A1 | 2/2022 | Castro | |

* cited by examiner

DEVICE AND METHOD FOR UNLATCHING A SURGICAL CLIP

PRIORITY

This patent application claims priority to U.S. Provisional Patent Application No. 63/185,920 filed on May 7, 2021, the entire disclosure of which is expressly incorporated herein by reference.

TECHNICAL FIELD

The present disclosure relates generally to devices and methods for unlatching and/or extracting a clip, and more particularly to devices and methods for unlatching and/or extracting a surgical clip from tissue.

BACKGROUND

Ligation of tissue (e.g., blood vessels, lymph nodes, nerves, cystic ducts, and cardiac tissue) is a common practice for many surgical procedures. This may be performed by closing a vessel with a surgical clip or by suturing the vessel with the surgical thread. The use of surgical thread requires complex manipulations of a needle and surgical thread to form knots required to secure the vessel. Such complex manipulations are time consuming and difficult to perform, particularly in endoscopic surgical procedures characterized by limited space and/or visibility. In contrast, surgical clips can be applied quickly in a temporary or permanent manner. Accordingly, the use of surgical clips in endoscopic and open surgical procedures has grown dramatically.

OVERVIEW

The present inventors recognize that there is a need for improvements to address inefficiencies of current devices for unlatching and/or extracting surgical clips. Current devices are often specifically designed to unlatch certain designs of clips and often do not work with clips having curved leg members and/or clips having a lamer radius of curvature. The current unlatching devices also have difficulty in removing or extracting the clip from an implant site of a body without it being compressed back into its closed configuration and relatching onto the tissue. Furthermore, the current unlatching devices need additional instruments to remove or extract the surgical clip.

One aspect of the present invention is directed to a device for unlatching a clip from a latched configuration, the clip comprising first and second leg members, the first leg member having a hook member and the second leg member having a tip member restrained by the hook member in the latched configuration. The device may include: a first jaw member configured to press on an outer surface of the first leg member to release the clip from the latched configuration and a second jaw member having a wall configured to engage the hook member and a channel configured to receive the tip member when unrestrained by the hook member.

In some embodiments, the first jaw member has a length that is shorter than a length of the second jaw member. In some embodiments, at least a portion of the channel is open on lateral sides. In some embodiments, the wall has a groove configured to receive the hook member, wherein the groove has a distal slope configured to deflect the hook member. In some embodiments, the first jaw member has a channel configured to receive the outer surface of the first leg member. In some embodiments, the first jaw member includes at least one tooth configured to engage the outer surface of the first leg member. In some embodiments, the channel of the second jaw member has a distal portion that has a distal slope. In some embodiments, the channel of the second jaw member has a proximal portion that has a proximal slope. In some embodiments, the distal portion of the channel of the second jaw member has a first width that is greater than a second width of the proximal portion of the channel of the second jaw member. In some embodiments, at least one of the first jaw member and the second jaw member has an aperture to allow visualization of the surgical clip. In some embodiments, the first jaw member has at least one engagement member configured to secure the clip to the device for extraction after unlatching. In some embodiments, the at least one engagement member include first and second engagement members configured to receive a portion of the clip therebetween. In some embodiments, the first and second engagement member include first and second hook members extending inwardly towards each other. In some embodiments, the device includes a proximal recess formed between the first jaw member and the second jaw member configured to receive a hinge member of the clip.

Another aspect of the present invention is directed to the device for unlatching a clip from a latched configuration. The device may include the first jaw member configured to press on the outer surface of the first leg member to release the clip from the latched configuration; and the second jaw member configured to engage the hook member, wherein the first jaw member may include at least one engagement member configured to secure the surgical clip to the device for extraction after unlatching.

In some embodiments, the at least one engagement member include first and second engagement members configured to receive a portion of the clip therebetween. In some embodiments, the first and second engagement member include first and second hook members extending inwardly towards each other. In some embodiments, the at least one engagement member is configured to engage first and second wing members of the surgical clip. In some embodiments, the first and second wing members has an inner surface spaced apart from an inner surface of the surgical clip and/or an outer surface spaced apart from an outer surface of the surgical clip. In some embodiments, the at first and second engagement members include substantially flat inner side surfaces. In some embodiments, the at least one engagement member includes an underside surface that is angled, chamfered, and/or ramped to facilitate insertion of the surgical clip.

Yet another aspect of the present invention is directed to a method of unlatching a clip from a latched configuration, the clip having first and second leg members having distal portions that are engaged with each other in the latched configuration. The method may include: receiving the clip between first and second jaw members of a device; pressing on an outer surface of the first leg member with the first jaw member to release the clip from the latched configuration; and receiving the distal portion of the second leg member in a channel of the second jaw member after being unrestrained by the first leg member.

In some embodiments, the first jaw member has a length that is shorter than a length of the second jaw member. In some embodiments, the distal portion of the first leg member has a hook member and the distal portion of the second leg member has a tip member restrained by the hook member in the latched configuration, the hook member is deflected when pressed to release the clip from the latched configuration, and the tip member is spaced apart from the hook member when received in the channel of the second jaw member. In some embodiments, at least a portion of the channel is open on lateral sides. In some embodiments, the method further includes engaging the distal portion of the first leg member with a wall of the second jaw member. In some embodiments, engaging the distal portion of the first leg member includes receiving the distal portion of the first leg member in a groove on the wall. In some embodiments, the groove has a distal slope that opens the hook member at the distal portion of the first leg member. In some embodiments, pressing on the outer surface of the first leg member includes pressing on a midsection of the outer surface of the first leg member with the first jaw member. In some embodiments, the method includes receiving an outer surface of the first leg member in a channel of the first jaw member. In some embodiments, the first jaw member includes at least one tooth configured to engage the first leg member. In some embodiments, the first and second leg members are curved with the outer surface of the first leg member being convex, and pressing on the outer surface of the first leg member includes straightening the first leg member. In some embodiments, the method further includes pressing on the first leg member to deflect the first leg member past a straightened configuration. In some embodiments, receiving at least part of the second leg member in the channel of the second jaw member includes receiving a distal portion of the second leg member in a distal portion of the channel having a distal slope. In some embodiments, receiving at least part of the second leg member in the channel of the second jaw member includes receiving a proximal portion of the second leg member in a proximal portion of the channel having a proximal slope. In some embodiments, the distal portion of the channel of the second jaw member has a width that is greater than a width of the proximal portion of the channel of the second jaw member. In some embodiments, the method further includes visualizing the clip through an aperture of at least one the first jaw member and the second jaw member. In some embodiments, the method further includes extracting the clip from an implantation site with the device. In some embodiments, the method further includes receiving a hinge member of the clip in a proximal recess of the device formed between the first jaw member and the second jaw member. In some embodiments, the method further includes receiving a portion of the first leg member between at least one engagement member of the first jaw member. In some embodiments, at least one engagement member includes first and second engagement members. In some embodiments, the method further includes receiving wing members extending from side surfaces of the first leg member between first and second engagement members.

Thus, some embodiments may be directed to a method of unlatching a clip from a latched configuration, the clip having first and second leg members, the first leg member having a hook member and the second leg member having a tip member restrained by the hook member in the latched configuration, the first and second leg members being curved. The method may include: receiving the clip between first and second jaw members of a device; engaging the hook member of the first leg member with a wall of the second jaw member; pressing on a convex outer surface of the first leg member with the first jaw member to straighten the first leg member, to deflect the hook member, and to release the clip from the latched configuration; and receiving the tip member in a channel of the second jaw member after being unrestrained by the hook member where the tip member is spaced apart from the hook member. Furthermore, the first jaw member may have a length that is shorter than a length of the second jaw member.

BRIEF DESCRIPTION OF THE DRAWINGS

In order that the invention may be readily understood, aspects of this invention are illustrated by way of examples in the accompanying drawings.

DETAILED DESCRIPTION

The invention will now be described with reference to the figures, in which like reference numerals refer to like parts throughout. In accordance with conventional practice, as used herein, and unless otherwise indicated herein, the term "proximal" refers to the relative positioning, of the device or a component generally closer to a user or medical personnel handling or manipulating the device as it is intended to be used, and the term "distal" refers to the relative positioning of the device or the component further from the user or medical personnel handling or manipulating the device as it is intended to be used. The term "vertical" refers to a relative direction of the device parallel or along a plane extending evenly through both jaw members or similarly to the component. The term "longitudinal" refers to a relative direction along a long axis or length of the device or the component. The term "lateral" refers to a relative direction parallel to or along a plane extending perpendicularly between the first and second jaw members or similarly to the component.

The present invention is directed to a device for unlatching and/or extracting a surgical clip from an implanted site in a body. The surgical clip may include first and second leg members having substantially matching curvature, with the first leg member having a convex outer surface and a hook member at a distal portion. The second leg member may have a tip member restrained by the hook member when the surgical clip is in the latched configuration. The device may include a jaw mechanism having first and second jaw members, where the first jaw member may be shorter than the second jaw member. One or both of the first and second jaw members may include channels, grooves, and/or teeth configured to align, secure, prevent lateral roll of, unlatch, and/or extract the surgical clip. The shorter length of the first jaw member may enable pressing against a midsection or apex of the convex outer surface of the first leg member with a distal end portion. The second jaw member may include a wall configured to engage the underside of the hook member. The wall may include a groove having an inner surface with a slope extending distally away from a longitudinal axis of the device to assist in deflecting or opening the hook member to remove the restraint on the tip member. The second jaw member may further include a channel below or recessed from the wall and/or groove of the wall to receive a tip member upon unlatching to separate the tip member from the hook member preventing the surgical clip from immediately relatching. The relief provided by the channel of the second jaw member may further allow the device to deflect the surgical clip such that the leg members are substantially parallel in a substantially straightened configuration and/or past parallel (e.g., such that the curvature of one or both of the leg members is reversed). The jaw mechanism may include a proximal recess formed between the first and second jaw members in a lateral direction configured to receive a proximal portion of the surgical clip and initial align the surgical clip between the first and second jaw members. The channel of the second jaw member may include proximal and distal portions sloped in opposite directions to receive at least a part of the curved second leg member. The jaw mechanism may also include at least one engagement member that secures the surgical clip to the device before, during, and/or immediately after unlatching to allow for extraction of the surgical clip from the implanted site in the body in one fluid motion without the need for an additional tool.

Figure 1:
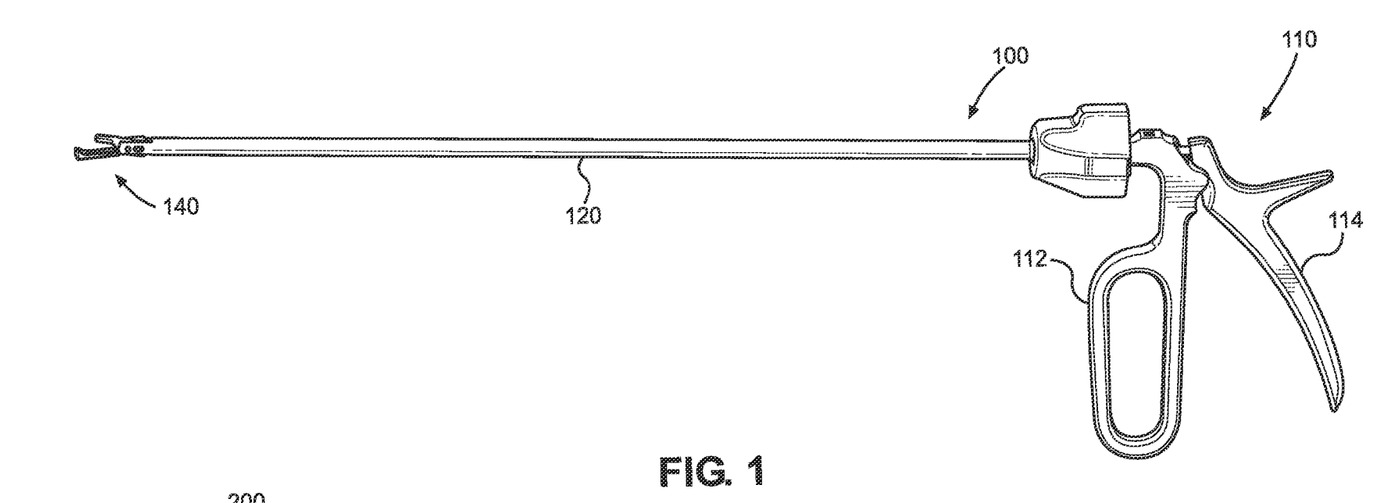
FIG. 1 illustrates a side view of an exemplary device for unlatching a surgical clip according to embodiments of the present disclosure.

FIG. 1 illustrates a side view of a device 100 for unlatching a surgical clip according to embodiments of the present disclosure. As illustrated, the device 100 may include a handle mechanism 110, an elongated shaft 120 extending distally from the handle mechanism 110, and a jaw mechanism 140 extending distally from the elongated shaft 120. The handle mechanism 110 may include a first handle member 112 and a second handle member 114 movably coupled to each other to actuate the jaw mechanism NO. For example, the first handle member 112 and the second handle member 114 may be pivotably attached. In a non-limiting illustrated example, the first handle member 112 may be fixed longitudinally relative to the elongated shaft 120, and the second handle member 114 may be fixed longitudinally relative to an actuator rod 122 extending through a lumen of the elongated shaft 120 (as in FIG. 3). In some embodiments, a proximal portion of the actuator rod 122 may have a ball received in a socket (not shown) of the second handle member 114, as further disclosed in U.S. Pat. No. 6,733,514, the entire disclosure of which is expressly incorporated herein by, reference. Pivoting the second handle member 114 relative to the first handle member 112 may longitudinally translate (e.g., retract and/or advance) the actuator rod 122 through the elongated shaft 120 to actuate or pivot the jaw mechanism 140 between an open configuration (e.g., FIG. 9) and a dosed configuration (e.g., FIG. 8). A spring (not shown) disposed between the first handle member 112 and the second handle member 114 may bias the jaw mechanism 140 from the closed configuration to the open or partially open configuration.

Figure 2:
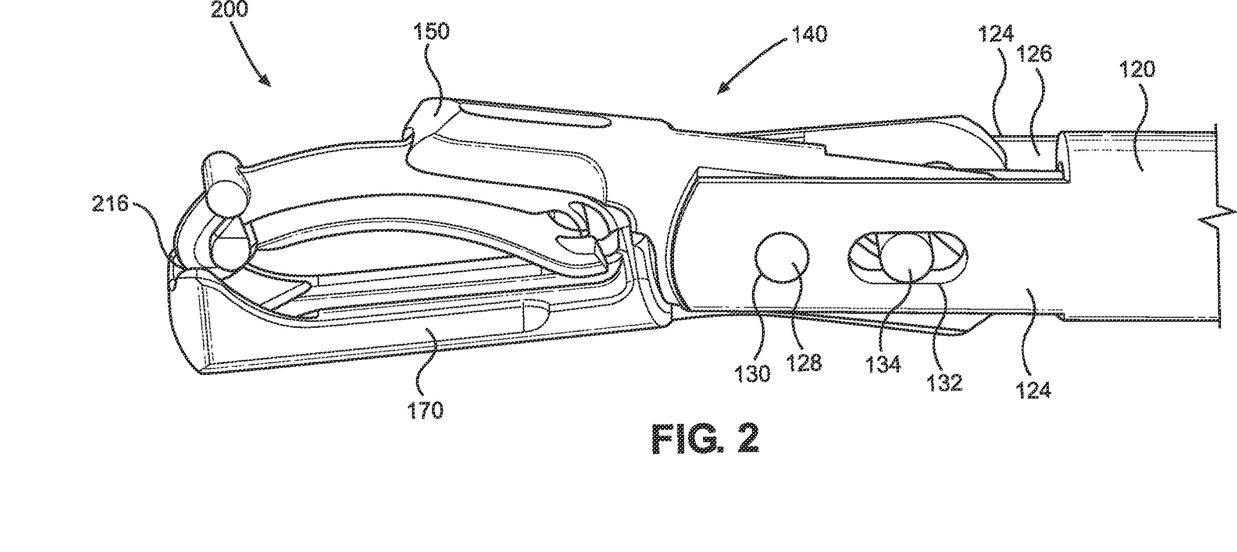
FIG. 2 illustrates a side view of a first embodiment of a jaw mechanism of the device of FIG. 1 engaging an exemplary surgical clip.
Figure 3:
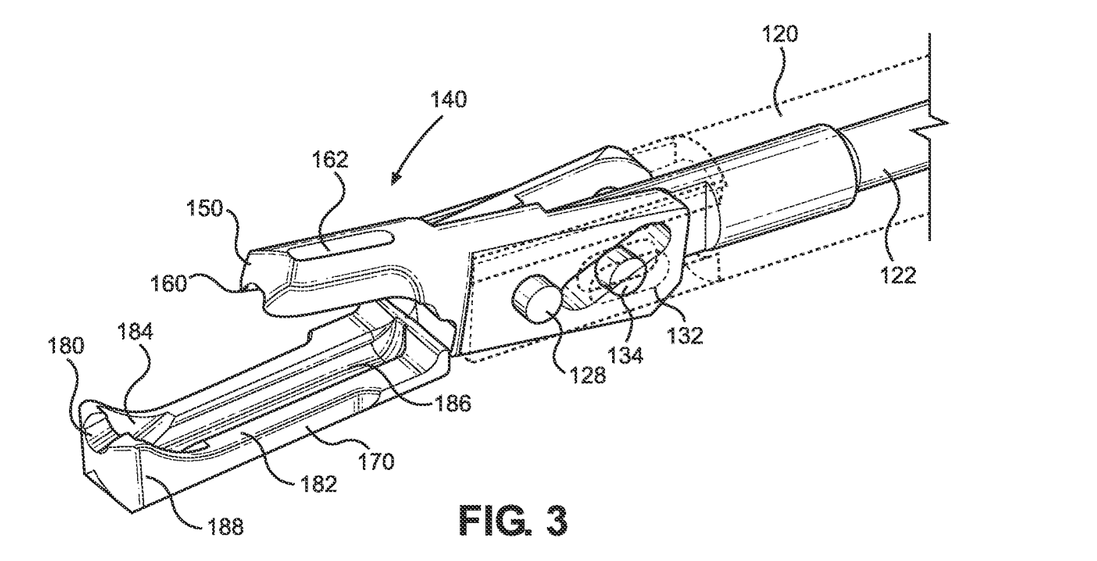
FIG. 3 illustrates an isometric view of the device of FIGS. 1 and 2.
Figure 5:
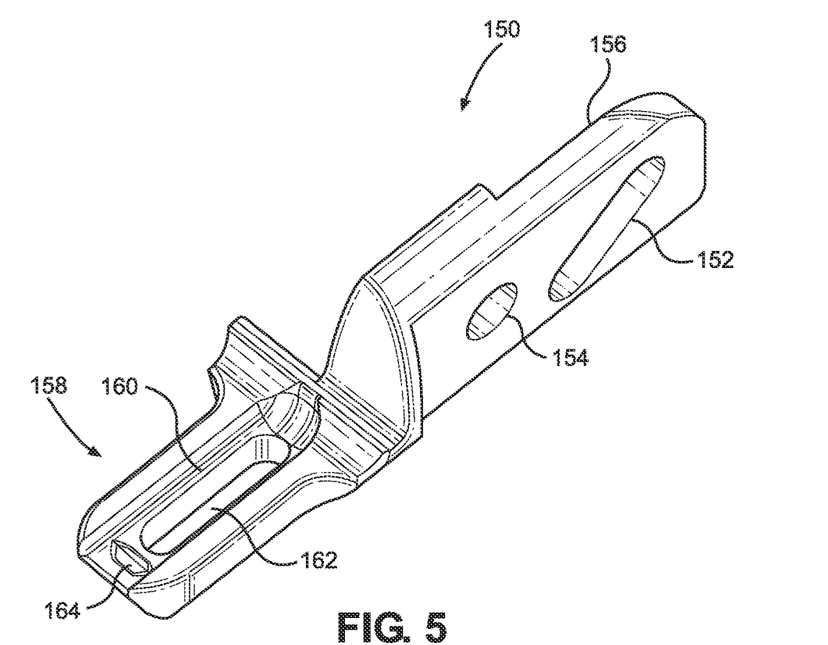
FIG. 5 illustrates an isometric view of a first jaw member of the jaw mechanism of FIGS. 2 and 3.
Figure 6:
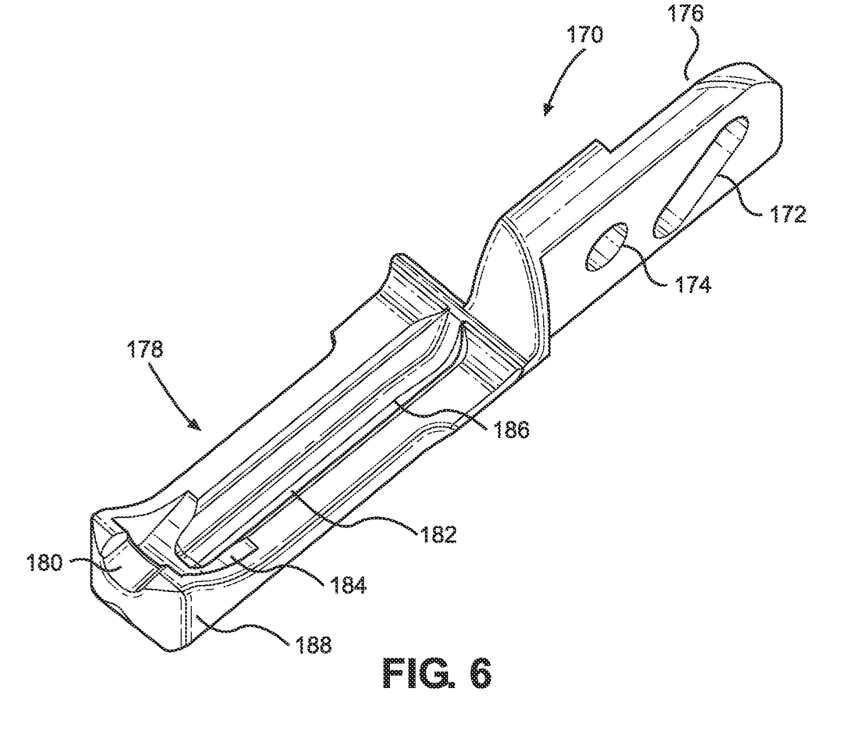
FIG. 6 illustrates an isometric view of a second jaw member of the jaw mechanism of FIGS. 2 and 3.
Figure 8:
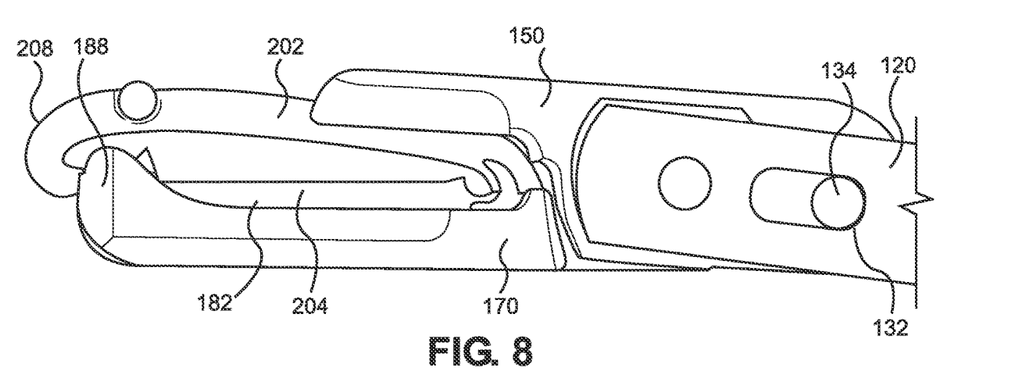
Figure 9:
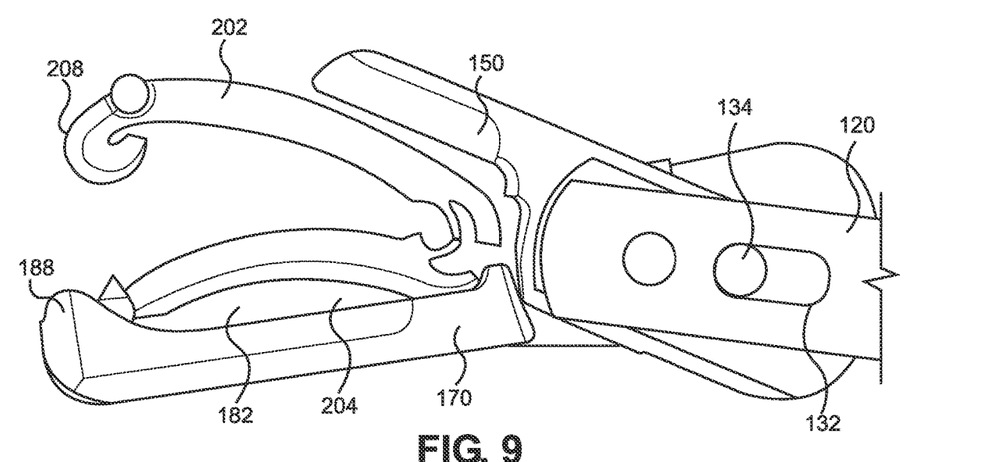
Figure 10:
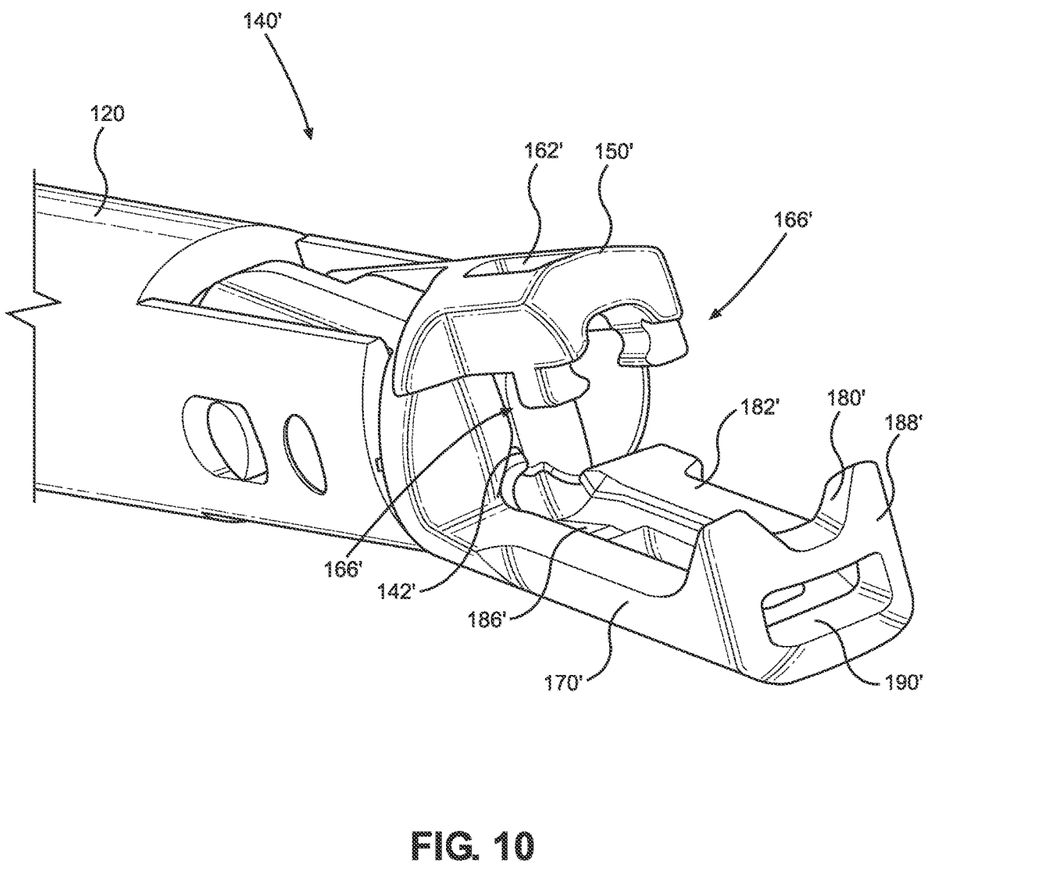
FIG. 10 illustrates an isometric view of a second embodiment of a jaw mechanism of the device of FIG. 1.

As further illustrated in FIGS. 2 and 3, the jaw mechanism 140 may include a first jaw member 150 and a second jaw member 170 configured to receive a surgical clip 200 therebetween. The elongated shaft 120 may have first and second distal arms 124 separated by a slot 126 configured to receive overlapping proximal portions of the first and second jaw members 150, 170. The first and second jaw members 150, 170 may be pivotably coupled with a pivot pin 128 extending through pivot holes 130 in each of the distal arms 124. The distal end of the actuator rod 122 may be received between the overlapping proximal portions of the first and second jaw members 150, 170. The distal end of the actuator rod 122 may have one or more drive bosses 134 extending from a distal end of the actuator rod 122, such that a first drive boss 134 may extend from a first side through a drive channel 152 of the first jaw member 150 (as illustrated in FIG. 5), and a second drive boss 134 may extend from a second side through a drive channel 172 of the second jaw member 170 (as illustrated in FIG. 6). Each of the drive channels 152, 172 may extend at an angle relative to a longitudinal axis of the respective jaw member 150, 170 to pivot the first and second jaw members 150, 170 between the open and closed configurations as the actuator rod 122 translates longitudinally. The distal arms 124 may further each have a drive channel 132 that is elongated or substantially oval along the longitudinal axis of the elongated shaft 120, such that the drive bosses 134 may travel through the drive channels 132 as the actuator rod 122 translates longitudinally through the elongated shaft 120. Thus, the jaw members 150, 170 may be oriented in the open configuration when the drive bosses 134 are in the distal position of the drive channels 132 (e.g., as illustrated in FIG. 9), and the jaw members 150, 170 may be oriented in the closed configuration when the drive bosses 134 are in the proximal position of the drive channels 132 (e.g., as illustrated in FIG. 8). However, the device 100 may embody other actuation mechanisms to produce scissors-like movement of the jaw members 150, 170, such as the actuation mechanism disclosed in WIPO Publication No. 2021/062170, the entire disclosure of which is expressly incorporated herein by reference.

Figure 4:
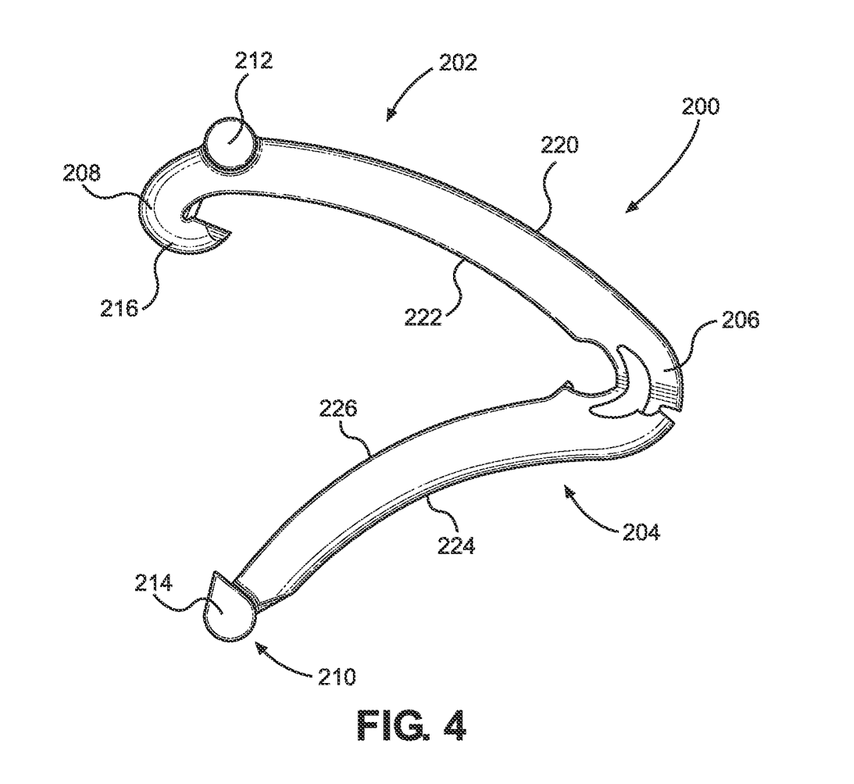
FIG. 4 illustrates a side view of the exemplary surgical clip of FIG. 2.

FIG. 4 illustrates a side view of an exemplary embodiment of the surgical clip 200. The surgical clip 200 may include a first leg member 202 and a second leg member 204 having proximal end portions pivotably coupled at a hinge member 206. The surgical clip 200 may include one or more latching mechanisms. For example, the first leg member 202 may include a distal end portion having a hook member 208, and the second leg member 204 may include a distal end portion having a tip member 210. The first leg member 202 and/or the second leg member 204 may be configured to pivot relative to each other between an open configuration and a closed, latched configuration via the hinge member 206. The hook member 208 may be C-shaped having a convex distal surface and a concave proximal surface. The tip member 210 may include a groove at a distal end. The surgical clip 200 may further include one or more engagement portions that form interfaces with a clip applier (not shown). For example, the first leg member 202 may include one or more bosses 212 on the distal end portion proximal of the hook member 208, and the second leg member 204 may include one or more bosses 214 on the distal end portion at the tip member 210. The one or more bosses 212, 214 may secure to the clip applier (not shown) during application of the surgical clip 200 to tissue. The one or more bosses 212, 214 may extend laterally from opposing sides of the first and second leg members 202, 204. For example, the first leg member 202 may include bosses 212 extending laterally from opposing sides of the hook member 208 and connected by a bridge member extending the width of the hook member 208. The second leg member 204 may include bosses 214 extending laterally from opposing sides of the tip member 210 and separated by the groove in the tip member 210.

Figure 7:
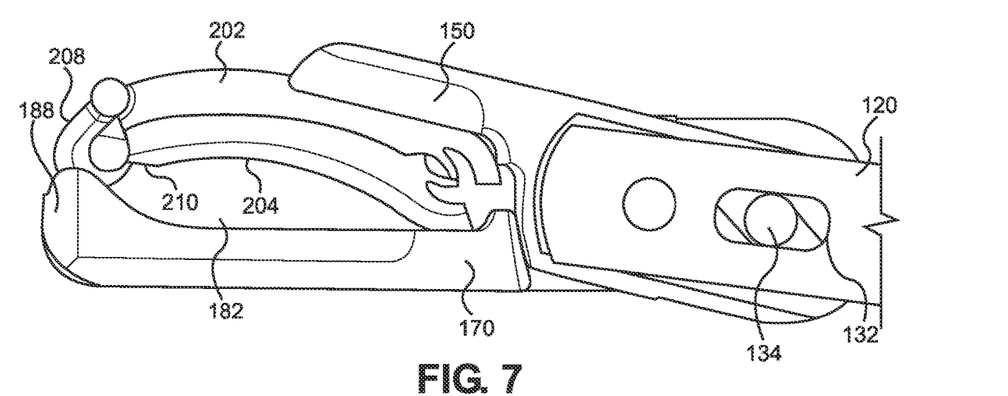
FIGS. 7-9 illustrates a method of unlatching, the surgical clip of FIGS. 2 and 4 with the device of FIGS. 1-3, 5 and 6.

The first and second leg members 202, 204 may each have a curvature extending substantially its entire length between the respective proximal and distal end portions. The first leg member 202 may have a convex outer surface 220 and a concave inner surface 222, and the second leg member 204 may have a concave outer surface 224 and a convex inner surface 226. The hinge member 206 may have a concave inner surface joining the inner surfaces 222, 226 and a convex outer surface joining the outer surfaces 220, 224. The clip applier (not shown) may engage the surgical clip 200 through engagement with the bosses 212, 214 to press the first and second leg members 202, 204 against each other. The convex outer surface of the hook member 208 may then engage camming beveled surfaces at the tip member 210, and one or both of the leg members 202, 204 may deflect as the leg members 202, 204 are continued to be pressed together. The first leg members 202 may lengthen or straighten and/or the second leg member 204 may compress to accommodate the hook member 208 deflecting and/or extending around tip member 210. The leg members 202, 204 may revert back to the curvatures in the latched configuration due to the natural resiliency of the surgical clip 200. Thus, the hook member 208 may receive the tip member 210 in the concave proximal surface in the latched configuration, as illustrated in FIGS. 2 and 7. The radii of curvature of the surfaces 220, 222 of the first leg member 202 and the surfaces 224, 226 of the second leg member 204 may substantially match to provide a relatively even distribution of compressive force applied across the width of the clamped tissue (e.g., a ligated blood vessel). The security of the latching mechanism is ensured when the clamped tissue exerts a counter force against the closure of the surgical clip 200 causing the leg members 202, 204 to deflect and lengthen moving the tip member 210 further into the hook member 208. Exemplary features and embodiments of the surgical clip 200 are further disclosed in U.S. Pat. Nos. 4,834,096 and 5,100,416, the entire disclosures of which are expressly incorporated herein by reference.

Figure 11:
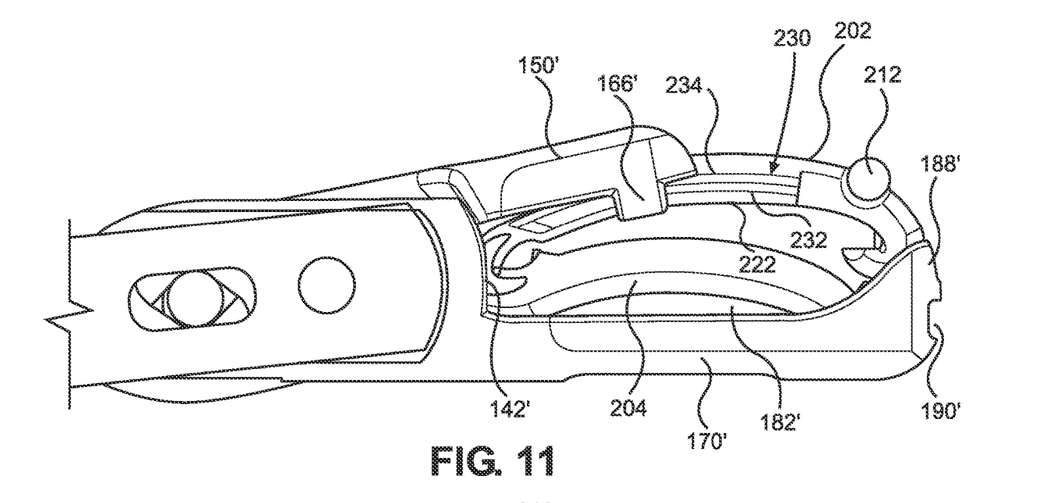
FIG. 11 illustrates a side view of the jaw mechanism of FIG. 10 engaging an exemplary surgical clip.
Figure 12:
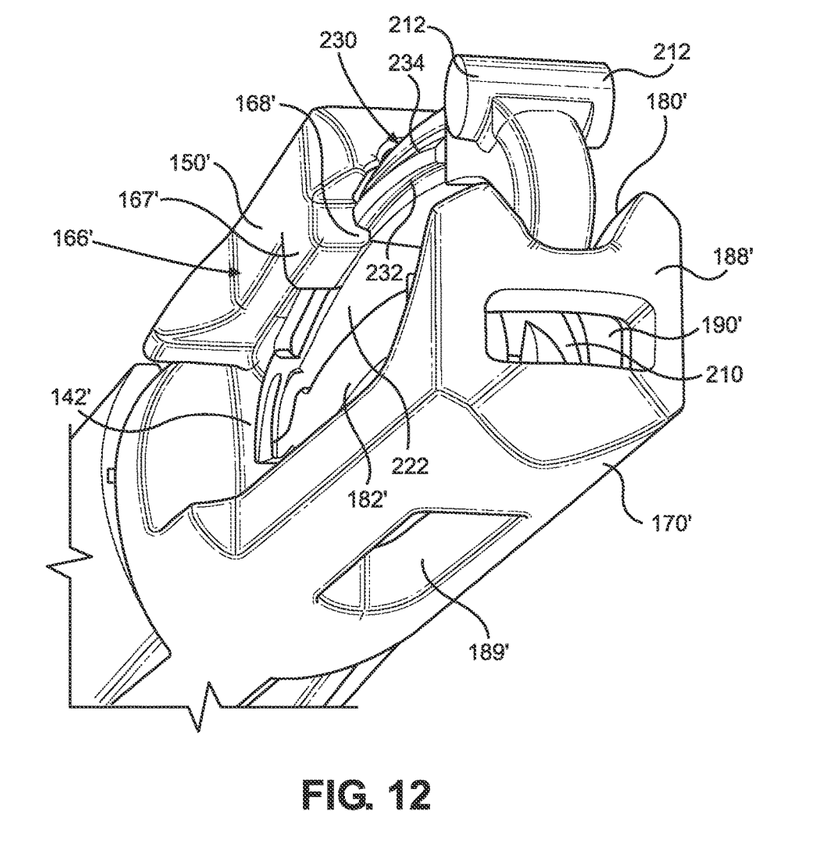
FIG. 12 illustrates an isometric view of the jaw mechanism of FIGS. 10 and 11 engaging the exemplary surgical clip of FIG. 11.

As further illustrated in FIGS. 11 and 12 (and not shown in FIG. 4), the surgical clip 200 may include a wing member 230 on each side surface of the first leg member 202. The wing members 230 may provide stability to the first leg member 202 to prevent the surgical clip 200 from twisting during application and/or ligation. The wing members 230 may extend for at least about a half of a length of the first leg member 202. A distal end of the wing members 230 may be proximal of the bosses 212 to avoid interference with the interface of the clip applier (not shown). The proximal end of the wing members 230 may be distal of the hinge member 206. The wing members 230 may further provide an interface with the unlatching device 100 to facilitate extraction of the surgical clip 200 without needing any additional instruments, as further discussed herein. As illustrated, the wing members 230 may have a longitudinal curvature that matches the curvature of the first leg member 202. The wing members 230 may have an inner surface 232 spaced apart and/or non-planar of the inner surface 222 of the first leg member 202. The wing members 230 may also have an outer surface 234 spaced apart and/or non-planar of the outer surface 220 of the first leg member 202. The spaced apart and/or non-planar configuration of the inner surface 232 and/or outer surface 234 may facilitate securement of the wing members 230 with the unlatching device 100 for removal and/or extraction from the implant site of the body. For example, the spacing and/or non-planar configuration of the inner surface 232 from the inner surface 222 of the surgical clip 200 may provide sufficient clearance from the ligated tissue for grasping underneath the wing member 230 without interference or pinching of ligated tissue. The inner surface 232 mar be substantially flat or concave inner surface to mate and/or interface with the device 100. Exemplary embodiments and additional features of the wing members 230 and the surgical clip 200 are disclosed in one or more of U.S. Patent Publication Nos. 2021/0186511 and 2021/0267603, the entire disclosures of which are expressly incorporated herein by reference. It is also contemplated that the present disclosure provides a system including the device 100 and the surgical clip 200.

As further illustrated in FIGS. 2 and 3, the jaw members 150, 170 may be sized to engage, unlatch, and/or extract the surgical clip 200 from the implant site of the body. The first jaw member 150 may be shorter than the second jaw member 170, and/or the first jaw member 150 may have a length that is shorter than a length of the second jaw member 170. For example, the length of the distal portion of the first jaw member 150 may be shorter than the distal portion of the second jaw member 170. In another example, a length from a pivot hole 154 to the distal end of the first jaw member 150 may be shorter than a length from a pivot hole 174 to a distal end of the second jaw member 170. The shorter length of the first jaw member 150 may be size such that a distal end of the first jaw member 150 may press on a midsection of the outer surface 220 (e.g., at or proximate to the apex of the outer surface 220) to straighten and/or lengthen the first leg member 202, as illustrated in FIGS. 7 and 8. The shorter length of the first jaw member 150 may also facilitate unlatching of surgical clips 200 having a larger radius of curvature (less curvature). The length of the distal portion of the second jaw member 150 may be sized to be at least the length of the surgical clip 200 (in the latched and/or straightened configuration) in order to engage an underside 216 of the hook member 208 on the opposite side of the second leg member 204 (as illustrated in FIGS. 2 and 7) and/or capture the second leg member 204 in a channel 182 after being unlatched (as illustrated in FIGS. 8 and 9).

FIG. 5 illustrates an isometric view of the first jaw member 150, and FIG. 6 illustrates an isometric view of the second jaw member 170. As illustrated, the first jaw member 150 may have a proximal portion including the drive channel 152 configured to receive one of the drive bosses 134 and the pivot hole 154 to receive the pivot pin 128. Similarly, the second jaw member 170 may have a proximal portion including the drive channel 172 to receive one of the drive bosses 134 and the pivot hole 174 to receive the pivot pin 128. The proximal portions of the jaw members 150, 170 may have a width that when overlayed is sized to be received between the distal arms 124 of the elongated shaft 120. The proximal portions of at least one or both of the jaw members 150, 170 may have a cutout 156, 176 that receives the distal end of the actuator rod 122 therebetween, as illustrated in FIGS. 2 and 3.

The jaw members 150, 170 may each have a distal portion configured to engage the surgical clip 200, the distal portions of each having a width greater than the respective proximal portion. The distal portions of each of the jaw members 150, 170 may have an inner surface 158, 178 with one or more channels and/or grooves configured to align, secure, prevent lateral roll of, unlatch, and/or extract the surgical clip 200. For example, the first jaw member 150 may have an inner channel 160 configured to receive the convex outer surface 220 of the first leg member 202. The channel 160 may longitudinally extend substantially the entirety length of the distal portion of the first jaw member 150 and through a distal surface of the first jaw member 150 to form an open distal end of the channel 160. The open distal end of the channel 160 may allow the first jaw member 150 to engage the outer surface 220 of the first leg member 202 along only a portion of its length, such that the first leg member 202 extends through and out of the channel 160 and distally of the first jaw member 150. The open distal end of the channel 160 may also allow the distal end of the first jaw member 150 to press against the midsection of the outer surface 220 of the first leg member 202. The channel 160 may be recessed in the inner surface 158, being enclosed with proximal and side surfaces to nest the outer surface 220 and stabilize the first leg member 202. The first jaw member 150 may include an aperture 162 through an outer surface and in communication with the channel 160 to enable visualization of the surgical clip 200 through the first jaw member 150, thus enabling visual confirmation to the user that the surgical clip 200 is loaded and/or unlatched properly. The first jaw member 150 may optionally include at least one tooth 164 in the channel 160 to engage the outer surface 220 and reduce longitudinal and/or rotational movement of the surgical clip 200. For example, the at least one tooth 164 may include a plurality of teeth 164.

The inner surface 178 of the second jaw member 170 may have a groove 180 on a distal end configured to receive the convex outer surface (e.g., the underside 216) of the hook member 208. The groove 180 may be generally concave to accommodate the convex outer surface of the hook member 208 and have a slope extending at an angle distally and toward the outer surface of the second jaw member 170 away from the longitudinal axis of the device 100 at least in the closed configuration to help retain and/or to provide a ramp to facilitate deflecting or opening of the hook member 208. The inner surface 178 may further include the channel 182 proximal of the groove 180 and configured to receive the second leg member 204 upon unlatching of the surgical clip 200. The inner surface of the groove 180 may be raised above the inner surface of the channel 182 and longitudinally aligned with the channel 182. Thus, the channel 182 may provide a relief allowing separation of the hook member 208 and tip member 210 during unlatching to prevent subsequent relatching prior to extraction of the surgical clip 200 from the tissue. For example, the groove 180 may be in a wall 188 above the channel 182 to receive the second leg member 204 after unlatching. At least a portion of the channel 182 may be open on lateral sides (as illustrated in FIGS. 7-9) to facilitate insertion of the surgical clip 200 between the first and second jaw members 150, 170 and/or visualization of the surgical clip 200 when in between the first and second jaw members 150, 170. The channel 182 may have a distal recessed portion 184 and a proximal recessed portion 186 in communication with each other and longitudinally aligned, each recessed in a rim of the inner surface 178 enclosed on the lateral sides). The distal recessed portion 184 may have a width larger than a width of the proximal recessed portion 186, such that the distal recessed portion 184 is sized to receive the enlarged width of the bosses 214 of the second leg member 204. The distal recessed portion 184 may have generally square corners configured to receive the generally square cross-section of bosses 214, and/or the proximal recessed portion 186 may be generally concave to receive the rounded cross-section of the outer surface 224 of the second leg member 204. The distal recessed portion 184 may have a slope extending distally and toward an outer surface of the second jaw member 170 away from the longitudinal axis of the device 100 (in a closed configuration). The proximal recessed portion 186 may have a slope extending proximally and toward the outer surface of the second jaw member and away from the longitudinal axis of the device 100 (in the closed configuration) to receive the curvature of the second leg member 204 and the hinge member 206 in the channel 182. The opposing slopes of the recessed portions 184, 186 may also facilitate elongation and unlatching of the surgical clip 200. For example, the hinge member 206 may ride in the proximal recessed portion 186 to elongate the surgical clip 200. Thus, as illustrated in FIGS. 3 and 6, the channel 182 may be recessed of the wall 188 having the groove 180 disposed on at a distal portion of the second jaw member 170. The channel 182 may longitudinally extend between the wall 188 to the proximal portion of the second jaw member 170 and/or the shaft 120. The wall 188 may embody a nose forming a hook- or L-shape at a distal end of the second jaw member 170 with a height greater than an immediately proximal length of the second jaw member 170. Thus, as illustrated in FIG. 3, the channel 182 may have a laterally open cutout extending proximally of the wall 188 toward the proximal end of the second jaw member 170. However, it is also contemplated that the wall 188 may extend substantially elevated around the channel 182 enclosing the lateral sides of the channel 182 (not shown). In either case, the surfaces of the groove 180, the distal recessed portion 184, and/or the proximal recessed portion 186 may be non-planar and non-continuous of each other to facilitate unlatching and/or extraction of the surgical clip 200.

FIGS. 7-9 illustrate a method of unlatching and/or extracting the surgical clip 200 with the device 100. The method may be performed to unlatch and/or extract the surgical clip 200 from a surgical operative configuration, for example, latched on a ligated end of a vessel after hemostasis or occlusion occurs. In use when the surgical clip 200 is to be extracted from the implant site of the body, the user may gain access to such site through appropriate surgical procedures exposing the surgical clip 200 in the latched configuration.

As illustrated in FIG. 7, the user may then receive the surgical clip 200 between the first and second jaw members 150, 170 and engage the surgical clip 200 with the device 100. The user may receive the surgical clip 200 in the latched configuration between the device 100 in the open configuration, such that the jaw members 150, 170 are sufficiently spaced apart (e.g., when the drive bosses 134 are close to or in the distal position of the drive channel 132). The device 100 may then align the surgical clip 200 with the jaw members 150, 170, which is enabled by the channels and/or grooves of the inner surface 158, 178 of the jaw members 150, 170. For example, the surgical clip 200 may be initially aligned with the device 100 by receiving the underside 216 of the hook member 208 in the groove 180 of the wall 188, receiving the hinge member 206 in the proximal recessed portion 186, and/or receiving the outer surface 220 of the first leg member 202 in the channel 160 of the first jaw member 150. The user may then partially close the first jaw member 150 to engage the first leg member 202 and/or receive the outer surface 220 in the channel 160. The pressure applied by the device 100 may further nest the surgical clip 200 in the groove 180 and channel 160 to further prevent lateral roll of the surgical clip 200 during the unlatching. Engagement of the at least one tooth 164 on the outer surface 220 may provide further security and prevent longitudinal movement of the surgical clip 200 (e.g., slipping out) during unlatching. The aperture 162 may enable the user to visualize the surgical clip 200 through the first jaw member 150 to ensure alignment of the surgical clip 200 with the jaw members 150, 170. At least part of the second leg member 204 (e.g., the distal portion and/or tip member 210) may be outside of the channel 182 when restrained in the latched configuration.

As illustrated in FIG. 8, the device 100 may unlatch the surgical clip 200 by pressing on the outer surface 220 to straighten the first leg member 202 from its natural curvature. The shorter length of the first jaw member 150 may enable sufficient pressure to be applied by a distal end of the first jaw member 150 to the midsection of the outer surface 220 to deflect or open the hook member 208 to release the tip member 210 of the second leg member 204, in a back bend motion. The opening of the hook member 208 may be enabled by the distal slope of the groove 180, transferring the compression of the first jaw member 150 into a distal force onto the underside 216 of the hook member 208. Once the second leg member 204 is no longer restrained by the hook member 208, the natural bias of the surgical clip 200 may cause the second leg member 204 to pivot or pop out of the hook member 208 and at least a part of the second leg member (e.g., the tip member 210) being received in the channel 182 of the second jaw member 170. At least part of the second leg member 204 may further pivot into the recessed portions 184. 186 of the channel 182. For example, the tip member 210 and bosses 214 may be received in the distal recessed portion 184 and at least a portion of the remaining second leg member 204 may be received in the proximal recessed portion 186. The relief provided by the channel 182 may allow the first jaw member 150 to deflect the leg members 202, 204 parallel in a substantially straightened configuration and/or past parallel (e.g., such that at least the outer surface 220 may turn concave). This increased deflection may enable the hook member 208 to deflect and more fully open ensuring that the second leg member 204 becomes unrestrained by the hook member 208. The relief provided by the channel 182 may also allow separation of the tip member 210 from the hook member 208 in a spaced apart manner when the first and second jaw members 150, 170 are closed and the hook member 208 regains its undeflected curved shape to prevent the surgical clip 200 from relatching prior to extraction.

As further illustrated in FIG. 9, the first jaw member 150 may open further in the fully open configuration relieving the pressure on the first leg member 202, such that the natural bias of the surgical clip 200 causes the first leg member 202 to pivot open, the leg members 202, 204 to regain their natural curvature, and the hook member 208 to regain its C-shape. The nesting of the surgical clip 200 in the channels 160, 182 (including the recessed portions 184, 186 and the at least one tooth 164) further provides the device 100 sufficient grip of the surgical clip 200 in the open configuration for extraction from the implant site from the body without any additional instruments. For example, a proximal surface of the wall 188 may engage the tip member 210 to prevent the surgical clip from sliding distally out of the jaw members 150, 170. A slight compression of the first jaw member 150 may further prevent relative rotation of the surgical clip (e.g., about a fulcrum of the wall 188), and the at least one tooth 164 may provide additional longitudinal security. The first jaw member 150 may have at least one engagement member 166' to provide further security to the surgical clip 200 for extraction, as illustrated and discussed with reference to FIGS. 10-14.

FIGS. 10-14 illustrate a second embodiment of a jaw mechanism 140' of the device 100. The jaw mechanism 140' may include all of the features of the jaw mechanism 140 (the disclosure of which is expressly incorporated herein in its entirety for sake of brevity) and may be illustrated with the same reference numbers and a prime symbol (') For example (as further discussed above), the jaw mechanism 140' may include a first jaw member 150' and a second jaw member 170' configured to receive the surgical clip 200 therebetween. The first jaw member 150' may be shorter than the second jaw member 170', and/or the first jaw member 150' may have a length that is shorter than a length of the second jaw member 170', as discussed above. The second jaw member 170' may have an inner surface 178' with a groove 180' on a distal end configured to receive the convex outer surface (e.g., the underside 216) of the hook member 208 of the surgical clip. The groove 180' may have a slope extending distally and toward an outer surface of the second jaw member 170' away from the longitudinal axis of the second jaw member 170 to help retain and to provide a ramp facilitating opening of the hook member 208. The inner surface 178' may further include a channel 182' proximal of the groove 180' and configured to receive the second leg member 204 upon unlatching of the surgical clip 200. The inner surface of the groove 180' may be raised above the inner surface of the channel 182'. Thus, the channel 182' may provide a relief allowing separation of the hook member 208 and tip member 210 during unlatching to prevent subsequent relatching prior to extraction of the surgical clip 200 from the implant site of the body. For example, the groove 180' may be in a wall 188' above the channel 182' for the channel 182' to receive the second leg member 204 after unlatching, but at least a portion of the channel 182 may be open on the lateral sides, as illustrated.

As further illustrated in FIGS. 10-14, the jaw mechanism 140' may further include a proximal recess 142' configured to receive a proximal portion of the surgical clip 200 (e.g., the hinge member 206) to laterally stabilize the surgical clip 200 during engaging, unlatching and/or extraction, as illustrated in the method of FIGS. 7-9 The proximal recess 142' may be formed between at least one of the first jaw member 150', the second jaw member 170', and/or the shaft 120 in a lateral direction. For example, as further illustrated in FIGS. 13 and 14, the proximal recess 142' may be formed between a first cutout surface 165' in the first jaw member 150' and a second cutout surface 185' in the second jaw member 170'. Each of the first cutout surface 165' and the second cutout surface 185' may be concave and/or angled configured to be disposed on laterally opposing sides of the proximal portion (e.g., the hinge member 206) of the surgical clip 200 and provide lateral stability to the surgical clip 200 during the engaging, unlatching and/or extracting.

As further illustrated, the jaw mechanism 140' may include the at least one engagement member 166' configured to provide additional security of the surgical clip 200 to the device 100 for extraction after unlatching. For example, the at least one engagement member 166' may be configured to create an interference fit with portion(s) of the surgical clip 200 (e.g., the wing members 230) before, during, and/or immediately after unlatching the surgical clip 200. The at least one engagement member 166' may be on a distal portion of the first jaw member 150', for example, on a distal half or a distal third of the distal portion of the first jaw member 150'. In some embodiments (as illustrated), the at least one engagement member 166' may include first and second engagement members 166' extending from the inner surface 158' of the first jaw member 150' on opposing sides of a channel 160' recessed in the inner surface 158'. The first and second engagement members 166' may be configured to receive and engage the wine members 230 of the first leg member 202 therebetween to secure the first leg member 202 to the first jaw member 150' when the first leg member 202 is received in the channel 160'. As the first jaw member 150' presses on the first leg member 202, the first and second engagement members 166' may be configured to deflect away from each other as the wing members 230 contact an underside surface 169' (FIG. 13) of the engagement members 166', and the first and second engagement members 166' may be biased back toward each other to secure the first leg member 202 in an interference and/or latched fit. The surgical clip 200 may, additionally or alternatively, be compressed as the first leg member 202 is received between the engagement members 166' in the interference and/or latched fit.

Figures 13, 14:
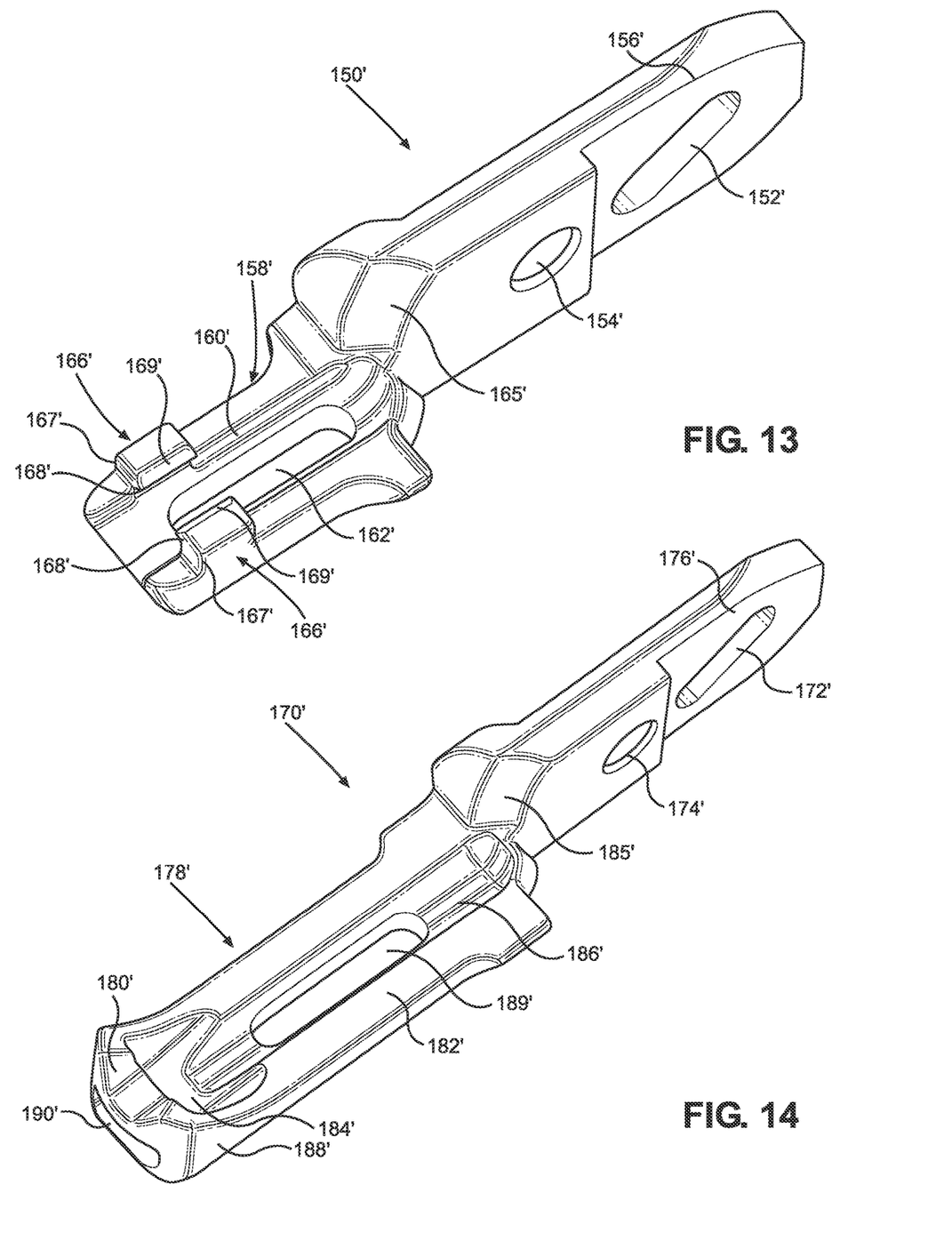
FIG. 13 illustrates an isometric view of a first jaw member of the jaw mechanism of FIGS. 10-13.
FIG. 14 illustrates an isometric view of a second jaw member of the jaw mechanism of FIGS. 10-13.

As further illustrated in FIGS. 12 and 13, each of the first and second engagement members 166' may have a first portion 167' extending downwardly from an inner surface 158' of the first jaw member 150' in a cantilever configuration toward the second jaw member 170'. In some embodiments, the first and second engagement members 166' may be configured to latch and include a second portion 168' extending laterally inward towards a central longitudinal, vertical plane of the surgical clip 200 and the opposing engagement members 166' to form hook or catch structures. The second portion 168' of the hook structures may have the underside surface 169' that may be angled, chamfered, and/or ramped to facilitate insertion and/or deflection of the engagement members 166'. The second portion 168' may be configured to fit underneath the wing members 230 of the surgical clip 200 in a positive latched and/or interference fit. As discussed above, the inner surface 232 of the wing members may be sufficiently spaced apart and/or non-planar of the inner surface 222 of the first leg member 202 to provide sufficient clearance for the second portion 168' to avoid interference or pinching of tissue ligated by the surgical clip 200.

However, in some embodiments (not shown), the engagement members 166' may be not configured to latch or be non-hook shaped (omitting the second portion 168'). For example, the portions 167' of the non-hook shaped engagement members 166' may include substantially flat or flat inner side surfaces (not shown) configured to provide an interference, frictional, squeezing, and/or clamping force against portion(s) of the clip (e.g., the wing members 230) to secure the first leg member 202 to the first jaw member 150'. The non-hook shaped engagement members 166 may still have the underside surface 169' that may be angled, chamfered, and/or ramped to facilitate insertion and/or deflection of the engagement members 166'.

In any case, the first and second engagement members 166' may secure or lock the surgical clip 200 to the jaw mechanism 140' providing additional security for extraction of the surgical clip 200 from the implantation site after unlatching from the ligated tissue without any additional instruments. The surgical clip 200 may then be pulled out of the first and second engagement members 166' by the user to remove the surgical clip 200 from the device 100 (e.g., once the jaw mechanism 140' is removed from the implant site of the body).

As even further illustrated, the first jaw member 150' may include an aperture 162' through an outer surface and in communication with the channel 160' to enable visualization of the surgical clip 200 through the first jaw member 150', thus enabling visual confirmation to the user that the surgical clip 200 is loaded and/or unlatched properly. The second jaw member 170' may include an outer aperture 189' through an outer surface and in communication with the channel 182' to enable visualization of the surgical clip 200 through the second jaw member 170', thus enabling visual confirmation to the user that the surgical clip 200 is loaded and/or unlatched properly. The second jaw member 170' may also include a distal aperture 190' through the wall 188' and in communication with the channel 182' to enable visualization of the surgical clip 200 through the first jaw member 150'. For example, the tip member 210 and/or bosses 214 may be visible through the distal aperture 190' to confirm unlatching of the surgical clip 200.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the ark it is not desired to limit the invention to the exact construction and operation illustrated and described, and accordingly, all suitable modifications and equivalents may be resorted to, falling within the scope of the invention.

What is claimed is:

1. A device for unlatching a clip from a latched configuration, the clip comprising first and second leg members, the first leg member having a hook member and the second leg member having a tip member restrained by the hook member in the latched configuration, the device comprising:
   a first jaw member configured to press on an outer surface of the first leg member to release the clip from the latched configuration; and
   a second jaw member having a wall configured to engage the hook member and a channel configured to receive the tip member when unrestrained by the hook member;
   wherein the wall has a groove configured to receive the hook member, and the groove has a distal slope configured to deflect the hook member.

2. The device of claim 1, wherein the first jaw member has a length that is shorter than a length of the second jaw member.

3. The device of claim 1, wherein at least a portion of the channel is open on lateral sides.

4. The device of claim 1, wherein the first jaw member has a channel configured to receive the outer surface of the first leg member.

5. The device of claim 1, wherein the first jaw member includes at least one tooth configured to engage the outer surface of the first leg member.

6. The device of claim 1, wherein the channel of the second jaw member has a distal portion that has a distal slope.

7. The device of claim 1, wherein the channel of the second jaw member has a proximal portion that has a proximal slope.

8. The device of claim 1, wherein the channel of the second jaw member has a distal portion with a first width and a proximal portion with a second width, wherein the first width is greater than the second width.

9. The device of claim 1, wherein at least one of the first jaw member and the second jaw member has an aperture to allow visualization of the clip.

10. The device of claim 1, wherein the first jaw member has at least one engagement member configured to secure the clip to the device for extraction after unlatching.

11. The device of claim 10, wherein the at least one engagement member includes first and second engagement members configured to receive therebetween a portion of the clip.

12. The device of claim 11, wherein the first and second engagement members comprise first and second hook members extending inwardly towards each other.

13. The device of claim 1, wherein the device includes a proximal recess formed between the first jaw member and the second jaw member configured to receive a hinge member of the clip.

14. A device for unlatching a clip from a latched configuration, the clip comprising first and second leg members, the first leg member having a hook member and the second leg member having a tip member restrained by the hook member in the latched configuration, the device comprising:
- a first jaw member configured to press on an outer surface of the first leg member to release the clip from the latched configuration; and
- a second jaw member having a wall configured to engage the hook member and a channel configured to receive the tip member when unrestrained by the hook member;
- wherein the first jaw member includes first and second engagement members configured to receive therebetween a portion of the clip and to secure the clip to the device for extraction after unlatching, and
- wherein the first and second engagement members comprise first and second hook members extending inwardly towards each other.

15. A method of unlatching a clip from a latched configuration, the clip comprising first and second leg members having distal portions that are engaged with each other in the latched configuration, the method comprising:
- receiving the clip between first and second jaw members of a device;
- pressing on an outer surface of the first leg member with the first jaw member to release the clip from the latched configuration;
- receiving the distal portion of the second leg member in a channel of the second jaw member after being unrestrained by the first leg member; and
- engaging the distal portion of the first leg member with a wall of the second jaw member;
- wherein engaging the distal portion of the first leg member includes receiving the distal portion of the first leg member in a groove on the wall, and
- wherein the groove has a distal slope to open the distal portion of the first leg member.

16. The method of claim 15, wherein the first jaw member has a length that is shorter than a length of the second jaw member.

17. The method of claim 15, wherein the distal portion of the first leg member has a hook member and the distal portion of the second leg member has a tip member restrained by the hook member in the latched configuration, the first leg member is deflected when pressed to release the clip from the latched configuration, and the tip member is spaced apart from the hook member when received in the channel of the second jaw member.

18. The method of claim 15, wherein pressing on the outer surface of the first leg member includes pressing on a midsection of the outer surface of the first leg member with the first jaw member.

19. The method of claim 15, further comprising receiving an outer surface of the first leg member in a channel of the first jaw member.

20. The method of claim 15, further comprising receiving a hinge member of the clip in a proximal recess of the device formed between the first jaw member and the second jaw member.

21. The method of claim 15, further comprising receiving a portion of the first leg member between first and second engagement members of the first jaw member.

* * * * *